United States Patent
Chamberlain

[15] 3,634,908
[45] Jan. 18, 1972

[54] VENT-CUTTING TOOL

[72] Inventor: Harold F. Chamberlain, New Haven, Conn.

[73] Assignee: Jarvis Corporation, Hartford, Conn.

[22] Filed: Feb. 11, 1970

[21] Appl. No.: 10,375

Related U.S. Application Data

[63] Continuation-in-part of Ser. No. 715,245, Mar. 22, 1968, abandoned.

[52] U.S. Cl. ...............................................17/11
[51] Int. Cl. ...............................................A22c 21/06
[58] Field of Search ...............................17/11, 45

[56] References Cited

UNITED STATES PATENTS

| | | |
|---|---|---|
| 2,795,815 | 6/1957 | Dahlberg ...............17/11 |
| 2,943,346 | 7/1960 | Jensen ...............17/11 |
| 3,526,018 | 9/1970 | Lovitt ...............17/11 |
| 2,590,785 | 3/1952 | Nealy ...............17/11 |
| 3,147,513 | 9/1964 | Schneider et al. ...............17/11 |

*Primary Examiner*—Lucie H. Laudenslager
*Attorney*—Delio & Montgomery

[57] ABSTRACT

A cutter apparatus suitable for use in processing poultry or the like, comprising a hollow cylindrical cutter having a cutting surface at one end thereof, a guide shaft having a portion thereof positioned within the confines of said cutter and another portion thereof extending beyond the cutting surface of said cutter, and means for rotating said cutter.

8 Claims, 9 Drawing Figures

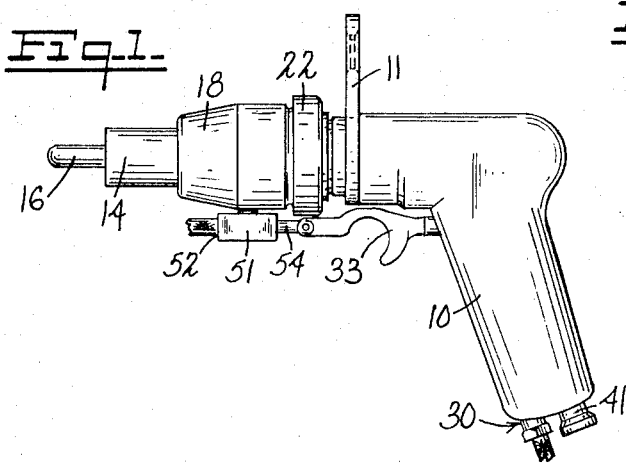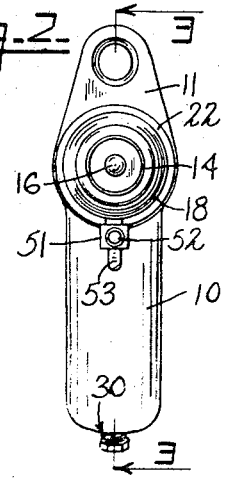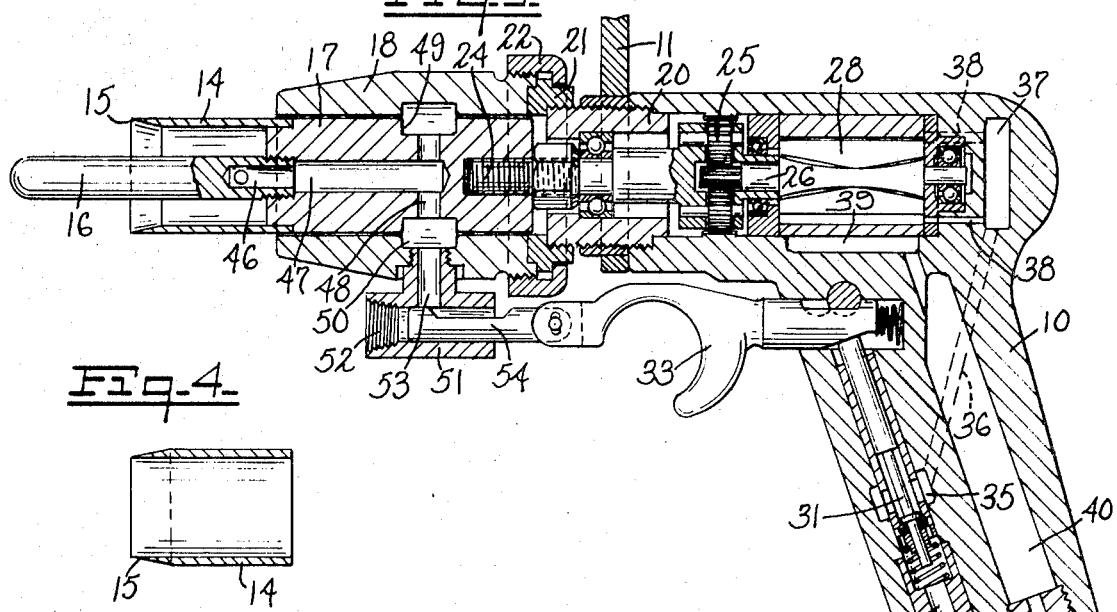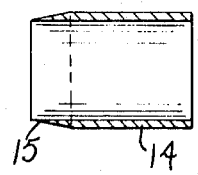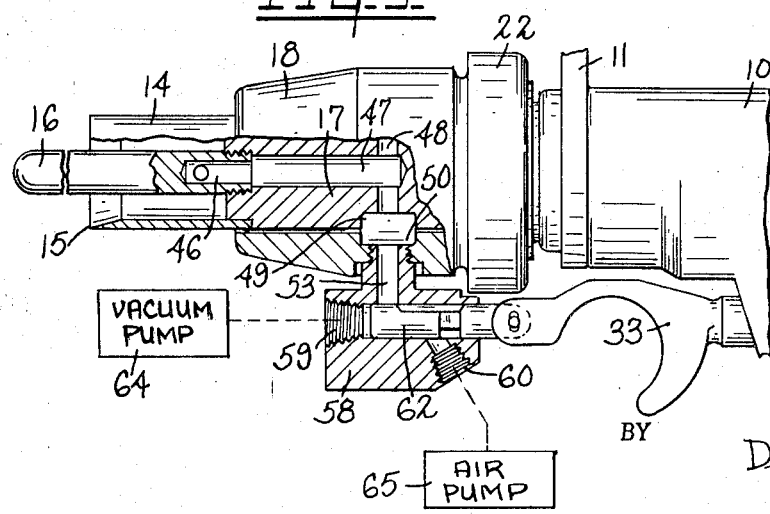
INVENTOR
Harold F. Chamberlain
BY
DeLio and Montgomery
ATTORNEYS

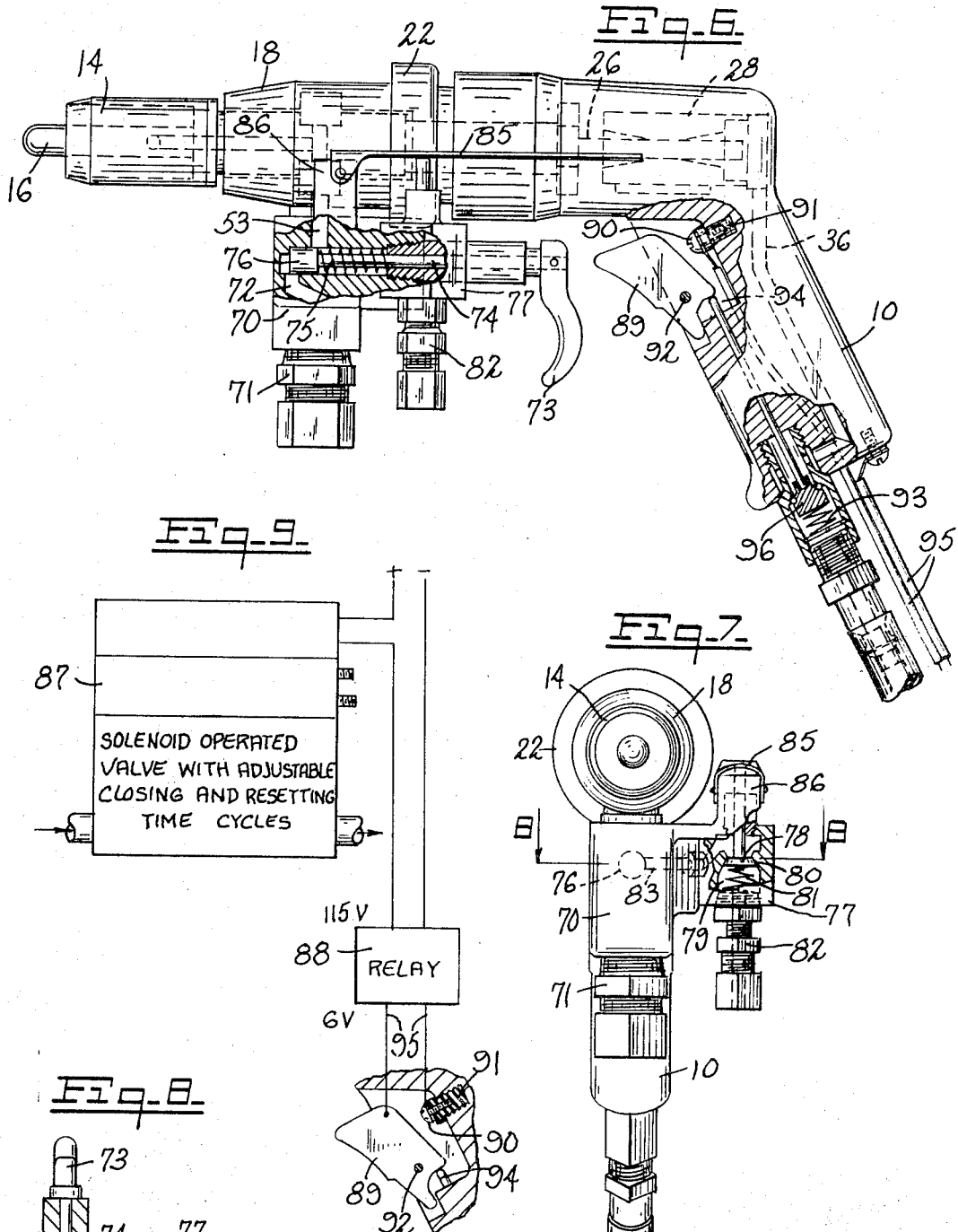

VENT-CUTTING TOOL

SPECIFICATION

This application is a continuation-in-part of copending application Ser. No. 715,245, filed March 22, 1968, now abandoned.

This invention relates to poultry processing, and more particularly to a cutter apparatus for cutting out or separating the rosebud gland and the vent or anus portions from a fowl carcass.

In the past, this portion of the processing of poultry has been an entirely manual operation, generally requiring at least two persons to slit the fowl and to cut about the vent so as to be able to remove the intestines of the poultry being processed. The vent and intestines must be removed during processing in order to prevent the poultry from being contaminated. With the instant invention, it is possible to completely sever the vent portion of the poultry carcass so that the intestines may be easily removed.

Accordingly, it is an object of this invention to provide a new and improved tool for use in the processing of poultry.

Another object of this invention is to provide a new and improved cutter apparatus which is capable of severing the inedible portions of a poultry carcass such that they may be removed from the carcass without contaminating the poultry being processed.

A further object of the invention is to provide a tool of the type described having new and improved means for cleaning thereof.

The features of the invention which are believed to be novel are pointed out with particularity and distinctly claimed in the concluding portion of this specification. However, the invention both as to its manufacture and operation, together with further objects and advantages thereof, may best be appreciated by reference to the following detailed description taken in conjunction with the drawings, wherein:

FIG. 1 is a side view of the cutter apparatus according to this invention;

FIG. 2 is a front view of the apparatus of FIG. 1;

FIG. 3 is a sectional view taken along lines 3—3 of FIG. 2;

FIG. 4 is an alternate embodiment of the cutter portion of the apparatus;

FIG. 5 illustrates partially in section a further embodiment according to this invention;

FIG. 6 is a side view of another embodiment of the invention, partially cut away to illustrate a valving mechanism;

FIG. 7 is a front view of the device of FIG. 6 partially cut away to illustrate another valving mechanism;

FIG. 8 is a view seen in the plane of lines 8—8 of FIG. 7; and

FIG. 9 is a diagram in schematic block form exemplifying a timing control for the device of FIGS. 6-8.

Referring to FIGS. 1-3, there is shown a cutter apparatus comprising an outer casing 10 for holding the apparatus while in use. Coupled to the housing 10 is a member 11 which may also be coupled to a support means so as to support the apparatus while it is being used since the apparatus of this invention is a fairly heavy instrument. The apparatus further comprises a cutter shown at 14 having a cutter edge 15. The cutter 14 is a hollow cylindrical member, as shown. Within the cutter 14 is positioned a guide shaft 16 having a portion thereof positioned within the confines of the cutter and also extending outwardly therefrom past the end of the cutter surface 15. The guide shaft 16 is preferably circular, having no rough surfaces on the tip thereof.

The cutter 14 as well as the guide shaft 16 are preferably supported by a rotatable member 17 supported for rotation within the housing shown at 18. Suitable bearing means are provided between the members 17 and 18 and O-ring type seals may also be utilized. The housing 18 is supported form a stationary member 20 coupled to the housing 10, which is accomplished by the use of a ring member shown at 21 and a capping member 22 which, in combination, securely couple the housing 18 to the member 20.

In order to propel or rotate the member 17, a drive shaft 24 is provided which is driven by means of a planetary gear arrangement 25, in this case, by a pneumatically propelled shaft 26. The shaft 26 is coupled to vanes 28 which are propelled by air entering the valve assembly shown at 30. The valve assembly 30 comprises a valve stem 31 coupled to a spring-loaded trigger mechanism generally shown at 33. By pressing the trigger 33 rearwardly, air is permitted to enter through the inlet of the valve mechanism shown at 34, thence through the passageway 35 through passage 36, into a chamber shown at 37 and through still another passage 38 to rotate the vanes 28. Air is exhausted form the vanes 28 through the passages shown at 39 and 40 which cooperate with the relief valve 41. Generally air is utilized for driving the vanes 28 but, in some cases, hydraulic fluid such as oil may also be used. It should be understood that electrical drive systems could also be used but, in the poultry and meat processing industry, pneumatic drive means are generally utilized for safety reasons.

As an important feature of this invention, air passages are provided which cooperate to permit a suction or vacuum to form, thus insuring that the material being severed will remain within the confines of the cutter 14. In the preferred embodiment of the invention, a fluid passage 46 is provided in the guide shaft 16. The passage 46 cooperates with fluid passages 47-49 formed within the rotatable member 17. Also, in the preferred embodiment, a fluid passage 50 is provided in the housing 18. This passage cooperates with a valve assembly shown at 51 having an inlet passage 52, an outlet passage 53 and a spool 54. The spool 54 is coupled to the trigger 33 in such manner that, as the cutter is being used, a vacuum may be formed within the cutter 14 by the use of a vacuum pump coupled to the inlet 52.

In practice, the probe or guide shaft is inserted within the vent and the trigger is then actuated so as to cause the cutter 14 to begin rotating. At the same time, due to the position of the spool 54, a vacuum is formed within the cutter 14. As the cutter penetrates about the vent of the poultry carcass being processed, the vent and associated intestines of the carcass are sucked into the cutter and held in place. Thereafter, the apparatus is withdrawn from the carcass but the vacuum pump is not turned off until the severed area is away from the carcass so as not to contaminate the carcass.

Now referring to FIG. 4, there is disclosed an alternate embodiment of the cutter 14. In particular, the cutter edge is slanted in a direction opposite to the cutter edge 15.

FIG. 5 illustrates a further embodiment of this invention. In particular, a modified valve assembly 58 includes two inlets 59 and 60 instead of the single inlet of FIGS. 1-3. A modified spool is shown at 62, having a reduced dimension portion 63. As shown in this figure, a vacuum pump 64 is coupled to the inlet 59 and an air pump 65 is coupled to the inlet 60. When the spool 62 is in one position a vacuum will be formed within the cutter 14, and when the spool is in another position air from the pump 65 will be forced into the cutter 14 so as to expel the material within the cutter.

Another embodiment of the invention is exemplified in FIGS. 6-9. In this embodiment the basic elements of the tool are identical to the elements shown in FIGS. 1-5 and, accordingly, will bear the like reference numerals. The device of FIGS. 6-9 is arranged to have the air motor and vacuum pump independently operated and also includes the provision for liquid flushing of the cutter 14. A vacuum pump is connected to the interior of housing 18 as previously described through passage 53 which is normally closed by a valving member 70 attached to housing 18. The vacuum line (not shown) is connected through fittings 71 to a passage 72 in member 70. Communication is established between the interior or tool 14 and passage 72 through passage 53 by retracting handle 73 on shaft 74 against the bias of spring 75. This will pull back valve 76 and connect the interior of housing member 18 with passage 72. Mounted to member 70 is a housing 77 having a valve 78 extending therein and closing a passage 79 when in contact with valve seat 80. Valve 78 is biased upwardly as by means of a spring 81. Suitable connectors 82 are provided through a line (not shown) leading to a source of water under pressure which may be a commercial waterline or a pump. When valve 78 is depressed passage 79 is placed in communication with a passage 83 generally horizontally defined in member 70 which leads to passage 53 as more clearly shown in FIG. 8. Water is admitted to passage 79 when valve 78 is depressed under the action of a lever 85 which is pivotally mounted to an upstanding portion 86 on housing 70 and has lever arm 85 extending rearwardly towards the handle.

Valve portion 78 is operated by means of a lever 85 which is pivotally mounted to an upstanding portion 86 of housing 70. Lever 85 extends toward the handle of the device and may conveniently be thumb operated.

The shaft 26 is operated by air pressure as previously described but provision is made for timing the cutting cycle. The air line (not shown) is connected to passage 36 through a solenoid-operated valve 87 with adjustable closing and resetting time cycle and a valve 96. An air exhaust outlet (not shown in FIG. 6) is provided as shown in FIG. 3. Valve 87 is operated from a low-voltage relay 88 which is energized upon making of contact between a trigger member 89 pivotally mounted to the handle and a conductive member 90 in the form of a screw also carried in the handle. Screw 90 is carried in an insulated sleeve 91 or screw also in the handle. Trigger 89 is pivoted at 92 and biased outwardly by means of a valve spring 93 and a plunger 94. Plunger 94 opens a normally closed valve 96 and admits air from valve 87 to chamber 37. When member 89 is moved clockwise as viewed in FIGS. 6 and 9 to close a circuit between lines 95 and energize relay 88, relay 88 will then apply line voltage to solenoid valve 87 and allow pilot air to be metered in a manner so as to time the closing of the valve to shut off the supply of air to chamber 37.

When the air valve 87 closes, the supply of air to the air motor will be interrupted and the cutting element of the tool will be rendered inactive. The voltage at contact member 90 is only 6 volts and presents no danger.

In operation, the operator only has to pull back handle 73 which may have sufficient travel to operate trigger 89 and commence operation of the air motor. Guide 16 is then inserted into the vent and the necessary cutting action takes place. At this time the cutting tool 14 is rotated and suction is applied to the interior thereof. At the same time suction is applied and maintains the cut parts in the cutting tool. After a predetermined time valve 87 shuts the air motor off which prevents winding up of the vent tube and breaking thereof within cutter 14 which could cause contamination therein. However, the full vacuum is still applied at the cutter in order to extract the vent and surrounding material. When the vent and surrounding material have been removed handle 73 is released to interrupt communication with the vacuum pump. Lever 85 is depressed and water is applied to the interior of cutter 14 to clean and flush the inside of tool 14 and thereby prevent the possibility of contamination when operating on succeeding chickens. The vacuum line may also be flushed by simultaneously pulling trigger 73 and depressing lever 85. This overcomes the problem of any removed parts clogging the vacuum line.

It may thus be seen that the objects of the invention set forth as well as those made apparent from the foregoing description are efficiently attained. While various embodiments of the invention have been set forth for purposes of disclosure other embodiments of the invention as well as modifications to the disclosed embodiments thereof may occur to those skilled in the art. Accordingly, the appended claims are intended to cover all embodiments of the invention as well as modifications to the disclosed embodiment thereof which do not depart from the spirit and scope of the invention.

What is claimed is:

1. A cutter apparatus suitable for use in processing poultry or the like, comprising a hollow cylindrical cutter having a cutting surface at one end thereof, a rotatable shaft for supporting said cutter, means for rotating said shaft, fluid passage means defined in said rotatable shaft communicating with the interior of said hollow cutter, a housing positioned about said shaft, said housing having fluid passage means formed therein which cooperate with said fluid passage means defined in said rotatable shaft, a valve for controlling the passage of fluid through said fluid passage means, said fluid passage means being connectable to a vacuum pump to create a partial vacuum in said cutter, and a trigger assembly for actuating said means for rotating said shaft, said trigger assembly also including means for controlling said valve to connect the interior of said hollow cutter to the vacuum pump.

2. The cutter apparatus of claim 1 in which said valve has two inlet passages, said valve has a spool, said spool directs the flow of fluid between said passages and said fluid passage.

3. A cutter apparatus suitable for use in processing poultry or the like, comprising a hollow cylindrical cutter having a cutting surface at one end thereof, a rotatable shaft for supporting said cutter at the other end thereof, means for rotating said shaft, fluid passage means defined in said rotatable shaft, a housing positioned about said shaft, said housing having fluid passage means formed therein which cooperate with said fluid passage means of said rotatable shaft, a valve for controlling the passage of fluid through said fluid passage means, said passage being connectable to a vacuum pump to create a partial vacuum in said cutter, and means for causing the expulsion of fluid through said valve and said cutter.

4. An eviscerating tool comprising a housing member, a hollow cylindrical cutter having a cutting surface at one end thereof, means rotatably mounting said cutter in said housing, means carried in said housing for driving said cutter, fluid passage means defined in said housing to the interior of said cutter, means connectable to said fluid passage means for creating a partial vacuum with said cutter, and means for connecting said passage means to a fluid line to expel material from the interior of said cutter.

5. A cutter apparatus according to claim 4 further including first valve means for connecting said passage to a vacuum-creating means, said second valve means for connecting said passage to said fluid line.

6. A cutter apparatus according to claim 5 wherein said fluid line may be connected to said passage when said first valve means is positioned to provide communication between said passage and said vacuum-creating means.

7. A cutter apparatus suitable for use in processing poultry and the like comprising a cylindrical cutter having a cutter surface at one end thereof, a rotatable shaft for supporting said cutter at the other end thereof, a fluid-actuated motor for rotating said shaft, fluid passage means defined in said rotatable shaft communicating with the interior of said hollow cutter, means for connecting said fluid motor means to a source of fluid pressure, timing means, said timing means being responsive to fluid actuation of said motor to interrupt fluid to said motor after a predetermined time interval.

8. A cutter apparatus suitable for use in processing poultry or the like, comprising a hollow cylindrical cutter having a cutting surface at one end thereof, a guide shaft having a portion thereof positioned within the confines of said cutter and another portion thereof extending beyond the cutting surface of said cutter, a rotatable shaft supporting said cutter, means for rotating said shaft, a first passage defined in said rotatable shaft to provide fluid communication to the inside of said cutter, a housing for said rotatable shaft, a second passage defined in said housing providing communication first to said passage, first coupling means for connecting said second passage to a vacuum source, second coupling means for connecting said second passage to a source of rinsing liquid, and valve means positioned in said housing to connect said second passage to said coupling means.

* * * * *